United States Patent
Noda

(10) Patent No.: US 6,671,861 B2
(45) Date of Patent: Dec. 30, 2003

(54) MANUFACTURING PROCESS EVALUATION METHOD FOR SEMICONDUCTOR DEVICE AND PATTERN SHAPE EVALUATION APPARATUS USING THE EVALUATION METHOD

(75) Inventor: Tomonobu Noda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 75 days.

(21) Appl. No.: 10/107,426

(22) Filed: Mar. 28, 2002

(65) Prior Publication Data

US 2002/0144221 A1 Oct. 3, 2002

(30) Foreign Application Priority Data

Mar. 29, 2001 (JP) ........................................ 2001-095968

(51) Int. Cl.[7] .............................................. G06F 17/50
(52) U.S. Cl. ................................ 716/4; 716/5; 716/11; 716/19
(58) Field of Search ............................ 716/1–21; 430/5

(56) References Cited

U.S. PATENT DOCUMENTS

| 5,048,094 A | * | 9/1991 | Aoyama et al. | ............. | 382/151 |
| 6,064,484 A | | 5/2000 | Kobayashi et al. | ......... | 356/390 |
| 6,316,163 B1 | * | 11/2001 | Magoshi et al. | ............ | 430/296 |
| 6,470,488 B1 | * | 10/2002 | Kao | ............................. | 716/19 |
| 2001/0053243 A1 | * | 12/2001 | Norioka et al. | ............. | 382/145 |
| 2002/0030187 A1 | * | 3/2002 | Noda et al. | ..................... | 257/48 |
| 2003/0001109 A1 | * | 1/2003 | Morio et al. | ........... | 250/492.21 |
| 2003/0018943 A1 | * | 1/2003 | Akutagawa et al. | ........... | 716/4 |

OTHER PUBLICATIONS

Niewczas et al., "An Algorithm for Determining Repetitive Patterns in Very Large IC Layouts," IEEE, Apr. 1999, pp. 494–501.*

Yamamoto et al., "Hierarchical Optical Proximity Correction on Contact Hole Layers," IEEE, Jul. 13, 2000, pp. 40–41.*

* cited by examiner

Primary Examiner—Vuthe Siek
(74) Attorney, Agent, or Firm—Oblon, Spivak, McClelland, Maier & Neustadt, P.C.

(57) ABSTRACT

First wiring pattern data corresponding to a shape of a wiring pattern on a layer in a semiconductor device is acquired on the basis of a first image obtained by imaging a sample which permits imaging of the wiring pattern. Evaluation CAD data which synthesizes CAD data of a plurality of layers, which includes wiring CAD data of the layer with the wiring pattern is generated. Position coordinates of the first wiring pattern data are made to coincide with position coordinates of a wiring pattern contained in the wiring CAD data, and synthesis data is produced by synthesizing the first wiring pattern data and the evaluation CAD data. Based on the synthesis data, a degree of overlapping between the first wiring pattern data and a pattern in the CAD data of a layer other than the layer with the wiring pattern is quantized.

11 Claims, 8 Drawing Sheets

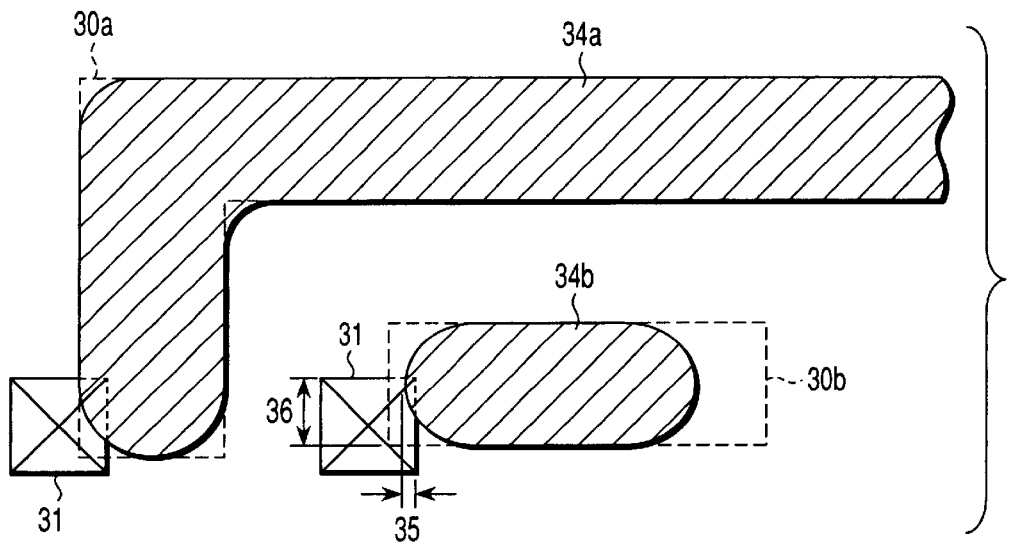
FIG. 10
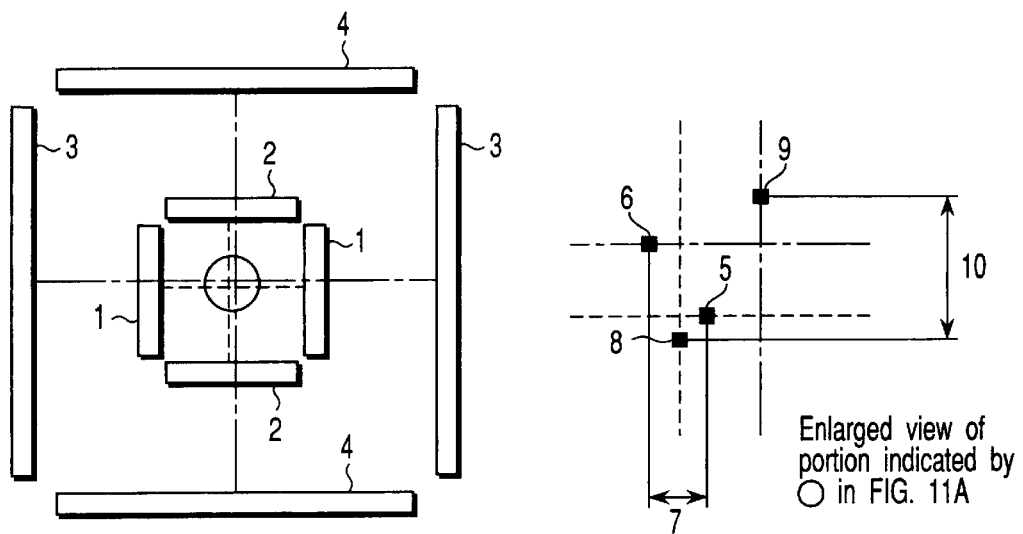
FIG. 11A
PRIOR ART
FIG. 11B
PRIOR ART

MANUFACTURING PROCESS EVALUATION METHOD FOR SEMICONDUCTOR DEVICE AND PATTERN SHAPE EVALUATION APPARATUS USING THE EVALUATION METHOD

CROSS-REFERENCE TO RELATED APPLICATIONS

This application is based upon and claims the benefit of priority from the prior Japanese Patent Application No. 2001-095968, filed Mar. 29, 2001, the entire contents of which are incorporated herein by reference.

BACKGROUND OF THE INVENTION

1. Field of the Invention

The present invention relates to a manufacturing process evaluation method for a semiconductor device and a pattern shape evaluation apparatus using the method, which evaluate a pattern misalignment between layers in the semiconductor device.

2. Description of the Related Art

In a semiconductor product, the degree of overlapping between patterns on layers need meet a certain requirement for the purpose of electric conduction between a wiring pattern on a given layer and a pattern on an overlapping adjacent layer. In the prior art, the amount of displacement in the overlapping (hereinafter referred to as "misalignment") is quantized and managed.

A description will now be given of a prior-art method of evaluating a pattern misalignment between layers of a semiconductor device.

In general, the amount of misalignment is measured using a purpose-specific pattern. FIGS. 11A and 11B are plan views showing configurations of misalignment measurement patterns. FIG. 11B is an enlarged view of part of FIG. 11A.

As is shown in FIG. 11A, patterns 1 and 2 are formed on a first layer, and patterns 3 and 4 are formed on a second layer provided on the first layer. As is shown in FIG. 11B, a distance between a middle point 5, which lies between the patterns 1, and a middle point 6, which lies between the patterns 3, is measured as a horizontal misalignment amount 7. Similarly, a distance between a middle point 8, which lies between the patterns 2, and a middle point 9, which lies between the patterns 4, is measured as a vertical misalignment amount 10.

As is shown in FIG. 12, when misalignment of patterns of an actual product is to be evaluated, an image of a scanning electron microscope (SEM) is obtained from just above the patterns 11. Dimensions 13 and 14 of patterns 12 formed on a first layer, which are partly visible under the patterns 11 formed on a second layer, are measured, and the misalignment is effected.

With modern progress in miniaturization of semiconductor devices, even if the amount of misalignment measured in design pattern data (CAD data) using a purpose-specific pattern is within a tolerable range, actual manufacture may not be carried out according to design dimensions due to reduction at a pattern end(shortening), etc. Consequently, observation of patterns of an actual product becomes necessary. In this case, it is necessary, as a minimum requirement, to form a plurality of patterns to be observed, and locations for measurement may vary depending on pattern layouts. Thus, the measurement of dimensions is complex and time-consuming.

As has been described above, with modern miniaturization of patterns, actual patterns formed by exposure may considerably differ from design dimensions. This necessitates a test for misalignment using the actual produced patterns. A plurality of pattern layers to be inspected need to be formed as a minimum requirement, and locations of measurement may vary, depending on pattern layouts.

BRIEF SUMMARY OF THE INVENTION (1) According to an aspect of the present invention, there is provided a semiconductor device manufacturing process evaluation method comprising: acquiring first wiring pattern data corresponding to a shape of a wiring pattern on a layer in a semiconductor device, on the basis of a first image obtained by imaging a sample which permits imaging of the wiring pattern; generating evaluation CAD data which synthesizes CAD data of a plurality of layers, which includes wiring CAD data of the layer with the wiring pattern; making position coordinates of the first wiring pattern data coincide with position coordinates of a wiring pattern contained in the wiring CAD data, and producing synthesis data by synthesizing the first wiring pattern data and the evaluation CAD data; and quantizing, based on the synthesis data, a degree of overlapping between the first wiring pattern data and a pattern in the CAD data of a layer other than the layer with the wiring pattern.

(2) According to another aspect of the invention, there is provided a pattern shape evaluating apparatus comprising: a database that stores CAD data of a plurality of layers, which includes first wiring pattern data corresponding to a shape of a wiring pattern on a layer in a semiconductor device and acquired on the basis of a first image obtained by imaging a sample which permits imaging of the wiring pattern, and CAD data of the layer with the imaged wiring pattern; an evaluation CAD data generating section which generates evaluation CAD data by synthesizing the CAD data of the layer with the wiring pattern and CAD data of a layer other than the layer with the wiring pattern, which are contained in the CAD data of the plurality of layers; a pattern matching section which produces synthesis data by making position coordinates of the first wiring pattern data coincide with position coordinates of a wiring pattern contained in the wiring CAD data in the evaluation CAD data, and synthesizing the first wiring pattern data and the evaluation CAD data; and a shape evaluation section which quantizes, based on the synthesis data, a degree of overlapping between the first wiring pattern data and the pattern in the wiring CAD data.

BRIEF DESCRIPTION OF THE SEVERAL VIEWS OF THE DRAWING

FIG. 10 illustrates a method of misalignment evaluation in connection with the image shown in FIG. 9;

FIGS. 11A and 11B are plan views schematically showing misalignment measurement patterns.

DETAILED DESCRIPTION OF THE INVENTION

Embodiments of the present invention will now be described with reference to the accompanying drawings.

First Embodiment

In a first embodiment of the invention, a length measurement SEM (Chips200: manufactured by SII) and pattern shape evaluation software (Grade Scope: manufactured by SII) are used as CAD navigation tools.

In the pattern shape evaluation software, an SEM image of a product pattern obtained by the length measurement SEM and CAD data at the same location are overlapped. Then, a line segment approximately representing the pattern contour extracted from the SEM image is matched as closely as possible with a line segment of a pattern included in the CAD data.

Figure 1:
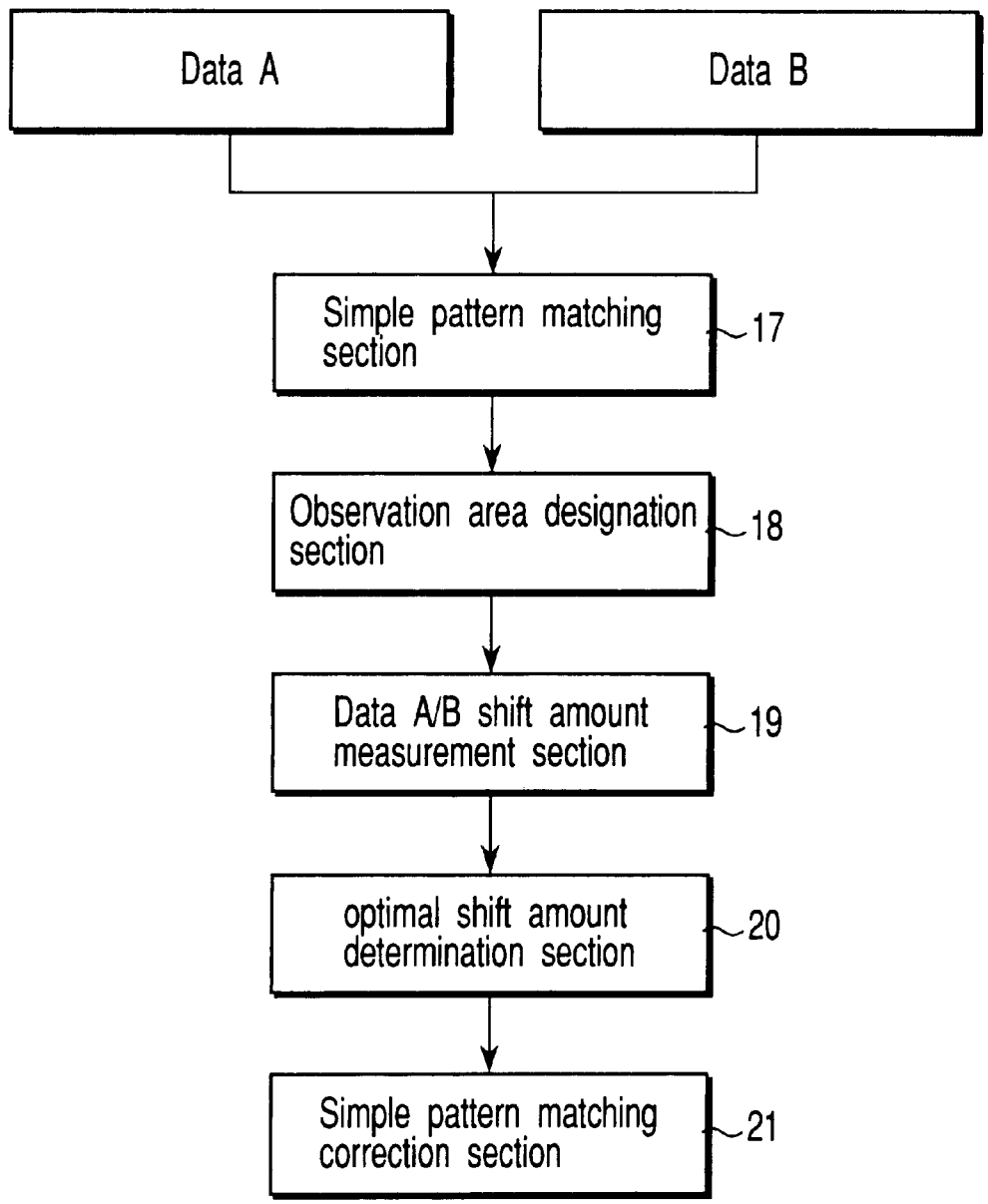
FIG. 1 is a block diagram illustrating a method of matching an SEM image and CAD data at the same location.

The method of matching will now be explained with reference to a block diagram of FIG. 1. A description will now be given of a case of matching two data elements, that is, data A on a line segment approximately representing the pattern contour extracted from the SEM image and data B on a line segment of a pattern included in the CAD data. A simple pattern matching section 17 performs simple pattern matching between data A and data B. An observation area designation section 18 designates an observation area, and a data A/B shift amount measuring section 19 measures a shift amount between data A and B at the observation area. Based on the measured shift amount, an optimal shift amount determination section 20 determines an optimal shift amount. A simple pattern matching correction section 21 executes correction, and the pattern matching is completed.

Figure 2:
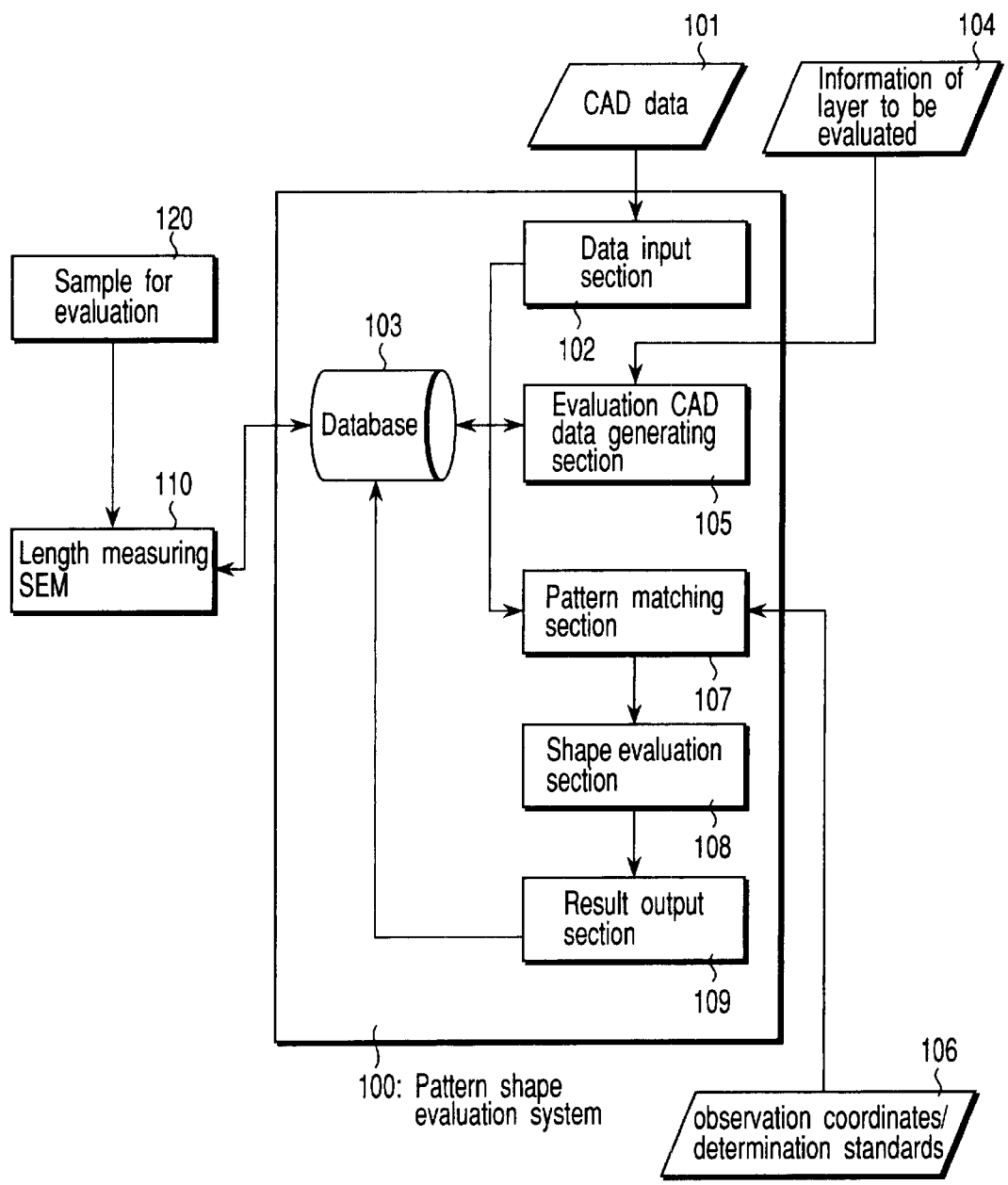
FIG. 2 is a block diagram showing the structure of a misalignment evaluation system for evaluating a misalignment between patterns on layers of a semiconductor device according to a first embodiment of the invention.

FIG. 2 is a block diagram schematically showing the structure of a misalignment evaluation system for evaluating a pattern misalignment between layers of a semiconductor device according to the first embodiment.

Figure 3:
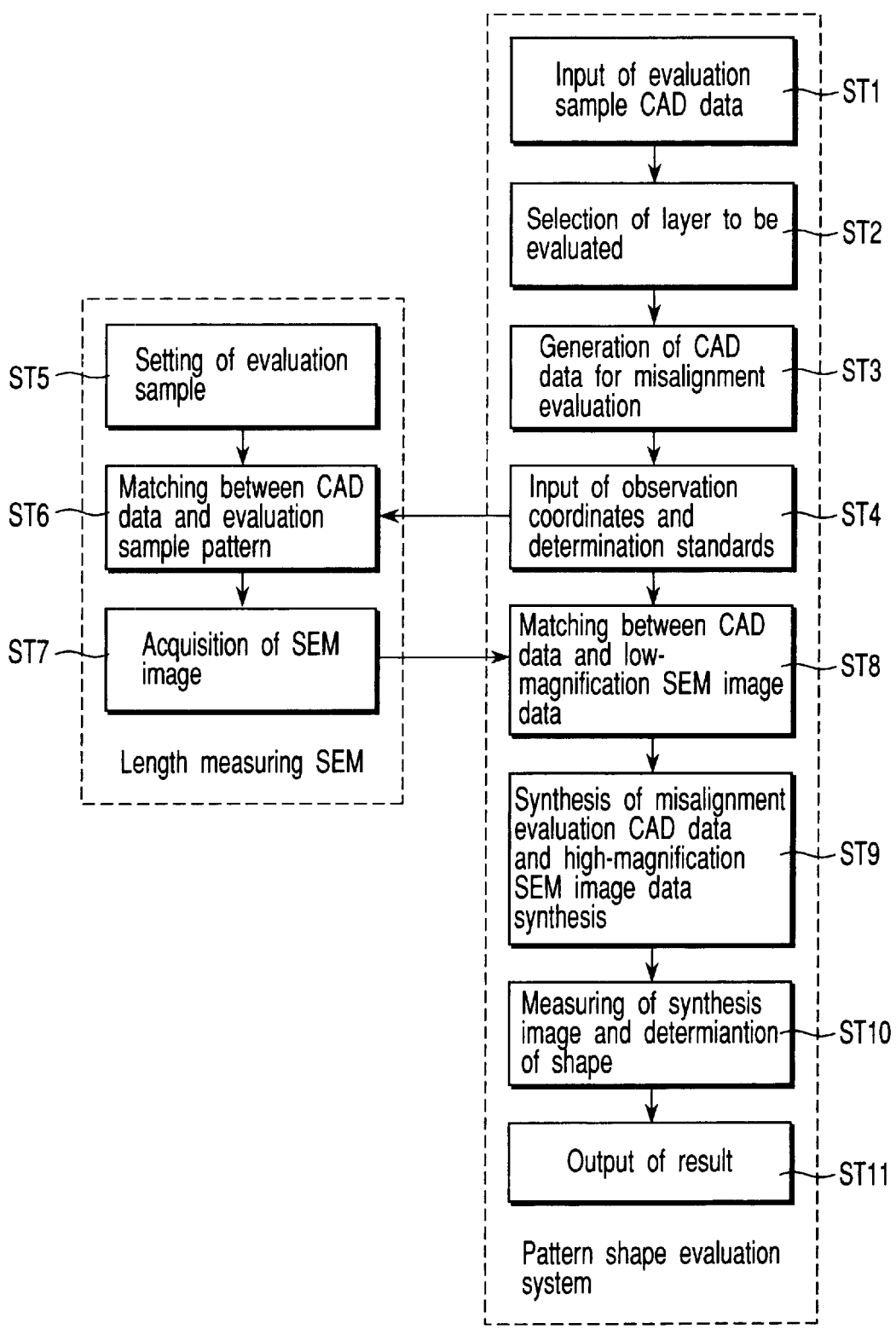
FIG. 3 is a flow chart illustrating an evaluation method using the pattern misalignment evaluation system shown in FIG. 2.

The structure of the pattern misalignment evaluation system shown in FIG. 2 will be described, while an evaluation method using the pattern misalignment evaluation system shown in FIG. 2 will be described with reference to a flow chart of FIG. 3.

(ST1)

A data input section 102 inputs to a database 103 CAD data 101 of each layer of a sample for evaluation and position coordinates corresponding to the CAD data.

(ST2)

In order to evaluate a misalignment between layers, information 104 of layers to be evaluated is input to an evaluation CAD data generating section 105. The layer information 104 contains information designating a wiring layer, an image of which is to be acquired by a length measuring SEM 110, and a plug layer for pattern misalignment evaluation relative to the wiring layer.

The number of layers for pattern misalignment evaluation relative to the wiring layer may be at least one.

It is preferable that a wiring layer, which is to be imaged, should be a wiring layer, in which such a defect as shortening, thickening or thinning may easily occur when patterning is effected by lithography, and an actual pattern of which is different from CAD data.

The present embodiment is directed to a case where a pattern misalignment evaluation of a plug layer, which is provided over a wiring layer, is performed.

(ST3)

Subsequently, the evaluation CAD data generating section 105 refers to the input layer information 104, and reads out of the database 103 the CAD data of the wiring layer and plug layer to be evaluated. The two read-out CAD data items are synthesized to generate CAD data for misalignment evaluation. The CAD data for misalignment evaluation in this context is data synthesized by relatively shifting position coordinates of patterns 30a and 30b of the wiring layer and position coordinates of patterns 31 of the plug layer on the wiring layer.

Figure 5:
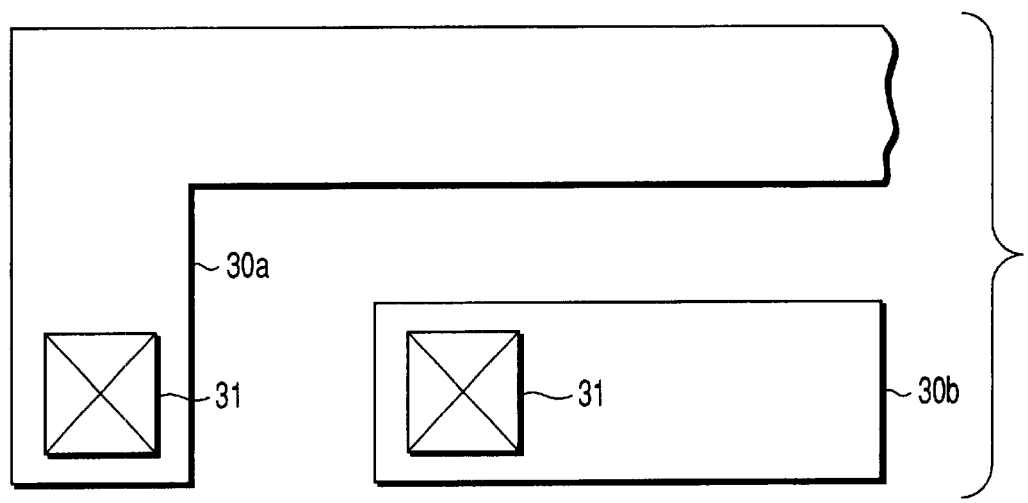
FIG. 5 schematically illustrates synthesized CAD data for misalignment evaluation, in which patterns on a wiring layer are not shifted relative to patterns on a plug layer lying on the wiring layer.

FIG. 5 shows CAD data synthesized without relatively shifting the patterns 30a and 30b of the wiring layer and the patterns 31 of the plug layer.

Figure 4:
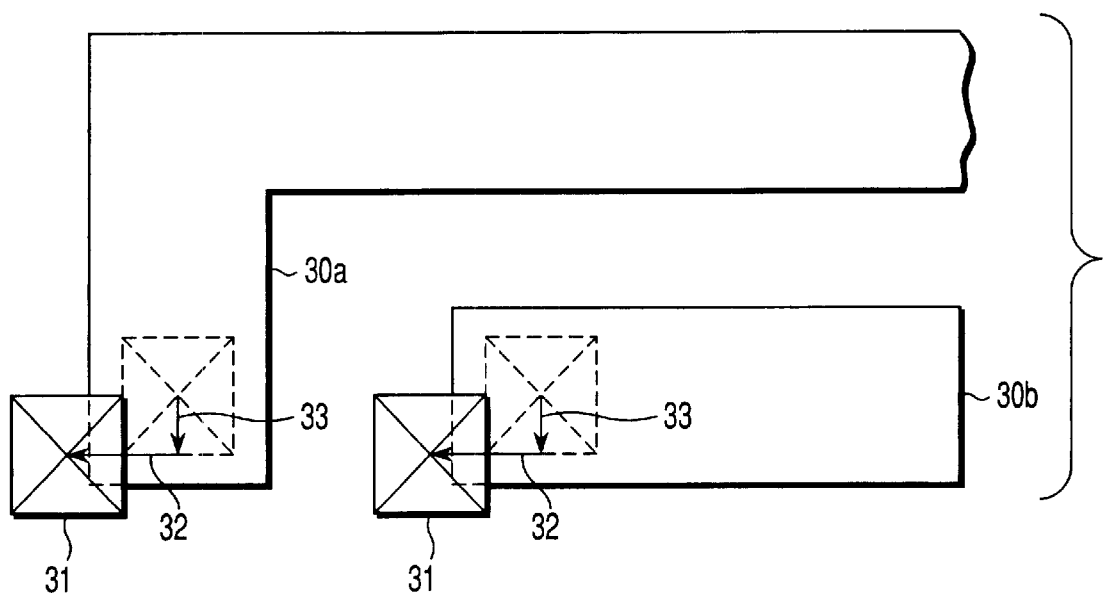
FIG. 4 schematically illustrates synthesized CAD data for misalignment evaluation, in which patterns on a wiring layer are shifted relative to patterns on a plug layer lying on the wiring layer.

As is shown in FIG. 4, when misalignment evaluation CAD data is to be generated, a vertical shift amount 32 between layers and a horizontal shift amount 33 between layers are median values or maximum misalignment values occurring in the actual semiconductor fabrication process. These shift amounts are contained in the to-be-evaluated layer information 104.

(ST4)

Pattern coordinate data on patterns to be subjected to pattern shape evaluation and determination standards 106 are input to a pattern matching section 107. In addition, CAD data of a wiring layer to be imaged and pattern coordinate data on patterns to be subjected to pattern shape evaluation are input to the length measuring SEM 110.

(ST5)

An evaluation sample 120 is set in a sample chamber of the length measuring SEM 110. The setting of the sample 120 may be carried out prior to step ST5. The evaluation sample 120 is not specified if a wiring layer, whose image is to be acquired, is formed on the sample. A substrate on which only a wiring layer to be evaluated is formed may be used as such a sample.

(ST6)

In the length measuring SEM 110, pattern matching between the CAD data of the wiring layer input in step ST4 and the wiring pattern observed on the surface of the evaluation sample is performed in a simple manner. The purpose of this step is to simply match the position coordinates on the evaluation sample and the position coordinates of the CAD data and to let the to-be-evaluated pattern fall within the visual field of the length measuring SEM, thereby to acquire an SEM image of the to-be-evaluated wiring pattern. In addition, by this simple pattern matching, position coordinates corresponding to the position coordinates on the CAD data are given within the visual field of the length measuring SEM 110.

(ST7)

Figure 6:
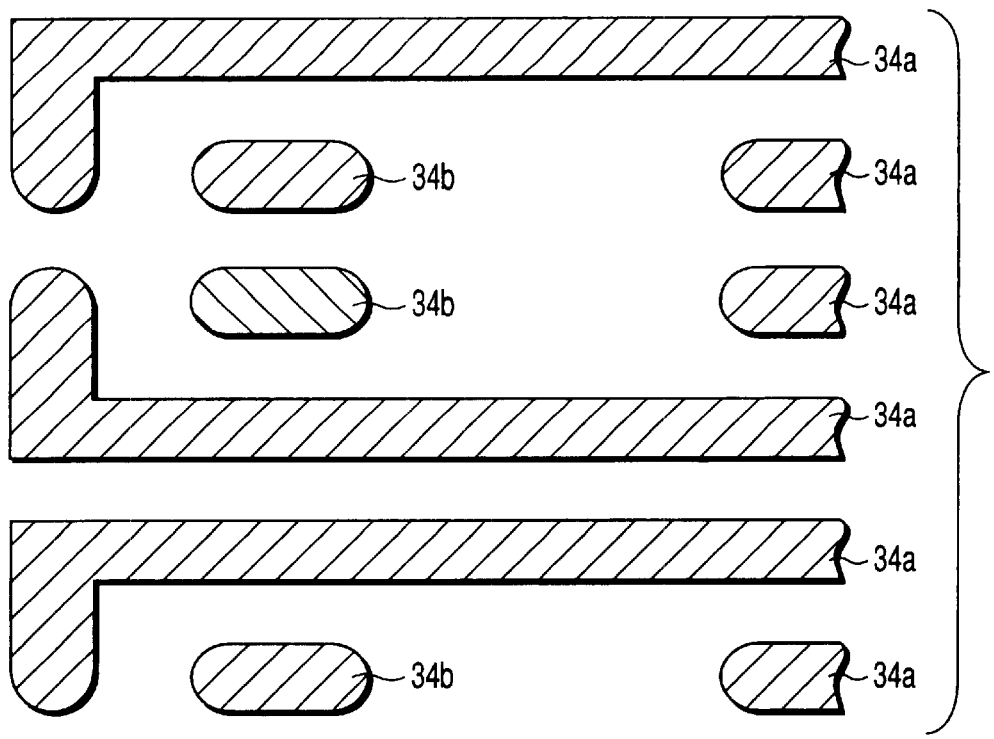
FIG. 6 schematically shows a low-magnification SEM image.
Figure 7:
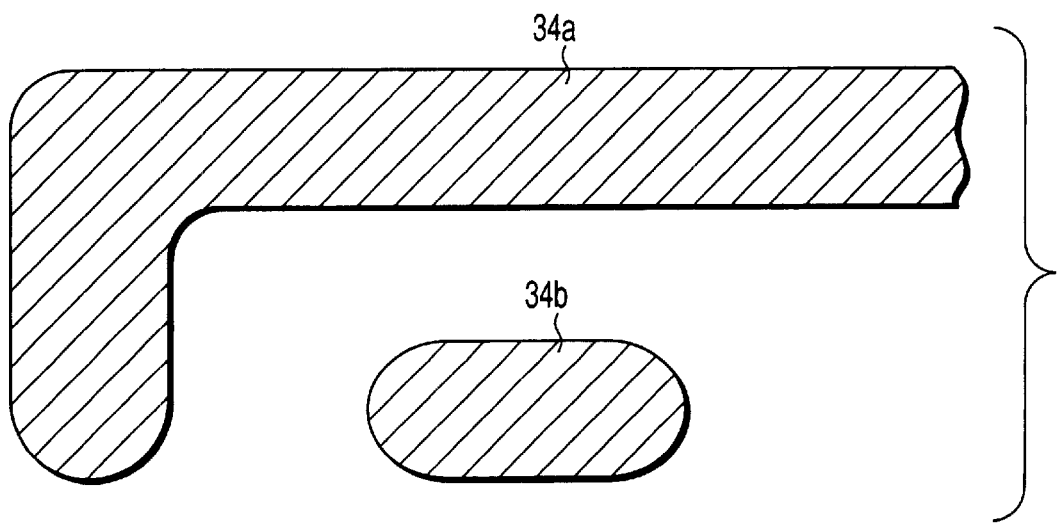
FIG. 7 schematically shows a high-magnification SEM image.

Subsequently, SEM images of an area to be evaluated are acquired by the length measuring SEM 110. The data of the acquired SEM images and the position coordinates provided by the SEM image data in step ST6 are linked and stored in the database 103 once again. As regards the SEM images, image data with at least two kinds of magnifications, i.e. a low-magnification SEM image (about×5 k, FIG. 6) and a high-magnification SEM image (about×30 k, FIG. 7), is acquired. An imaged area of the low-magnification image includes an image area of the high-magnification image. The data of the SEM image in this context is data of line segments approximating the contour of the wiring pattern extracted from the SEM images. In FIGS. 6 and 7, reference numeral 34a denotes wiring patterns, and 34b island patterns.

(ST8)

The acquired SEM image data items with two magnifications are input to the pattern shape evaluation system 100. The pattern matching section 107 performs pattern matching between the acquired SEM image data and the layer, the image of which has been acquired, in the misalignment evaluation CAD data.

Thus, the position coordinates given to the image data in step ST6 are corrected relative to the position coordinates of the CAD data. The pattern matching section 107 corresponds to the above-mentioned pattern shape evaluation software.

Figure 8:
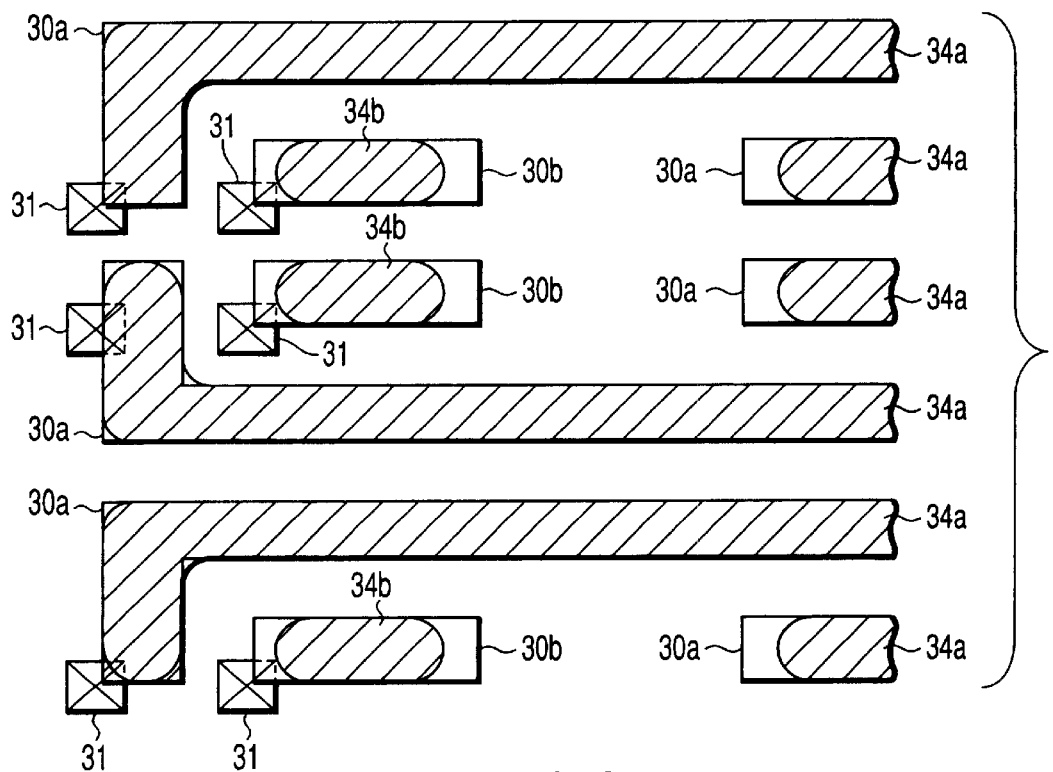
FIG. 8 schematically shows an image obtained by overlapping low-magnification SEM image data and equal-magnification CAD data for misalignment evaluation.

In the pattern matching section 107, as shown in FIG. 8, the misalignment evaluation CAD data having the same magnification as the low-magnification SEM image data is used, and all wiring patterns in the visual field are similarly arranged. An optimal shift amount is calculated for the pattern in the CAD data and wiring pattern in the low-magnification image data become optimal.

(ST9)

Figure 9:
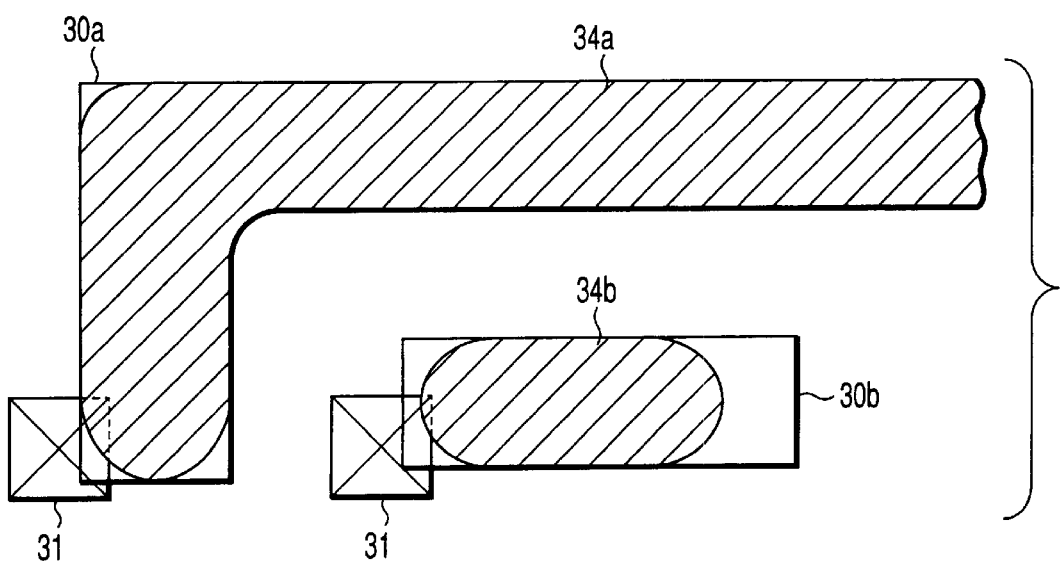
FIG. 9 schematically shows an image obtained by synthesizing high-magnification SEM image data and CAD data for misalignment evaluation.
Figure 12:
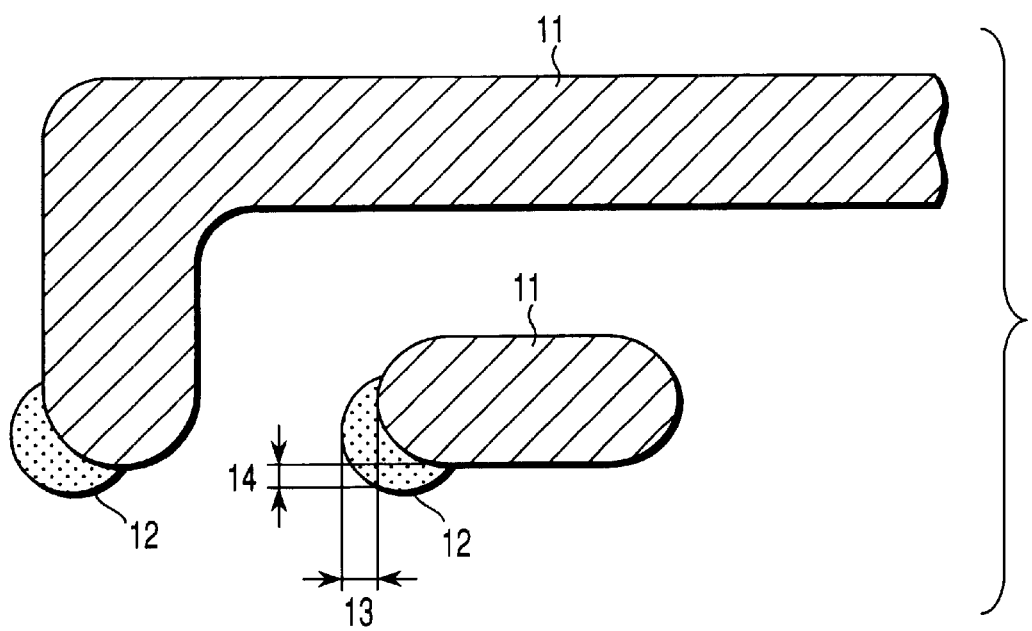
FIG. 12 illustrates a misalignment evaluation method using misalignment measurement patterns.

Subsequently, based on the shift amount calculated in step ST8, synthesis data of the high-magnification SEM image data and misalignment evaluation CAD data is produced and displayed, as shown in FIG. 9.

The reason why the image data with two different magnifications is synthesized in steps ST8 and ST9 is as follows. In a case where shortening, etc. has occurred in the pattern to be observed and there is a difference between the pattern of CAD data and the actual pattern to be observed, if pattern matching is performed using only the high-magnification SEM image data and the to-be-evaluated pattern, a well-balanced shift amount is calculated with respect to this pattern and recognition of a defective shape becomes difficult. Thus, it is necessary to calculate a well-balanced shift amount with respect to low-magnification pattern images including patterns not to be evaluated.

(ST10)

Subsequently, using the synthetic data obtained in step ST9, a shape evaluation section 108 measures the length of a portion to be observed, and determines the shape based on the measured result.

For example, in FIG. 10, relative to the island pattern 34b on the layer to be imaged, the area of the portion overlapping with the misaligned upper pattern 31, a horizontal shift amount 35 and a vertical shift amount 36 are measured for shape determination.

(ST11)

The determination result in step ST10 is fed back from a result output section 109 to parameters such as a management value of misalignment between upper and lower layers, upper-layer pattern dimensions, and shape variations.

In the present embodiment, misalignment evaluation CAD data is obtained by synthesizing the data on the wiring layer and plug layer, following which the SEM image data and evaluation CAD data are synthesized. Alternatively, after synthesizing the CAD data of the wiring layer and the SEM image data of the wiring layer, the CAD data of the plug layer may be synthesized with the synthesized data.

Second Embodiment

A second embodiment of the present invention differs from the first embodiment with respect to the step (ST3) of generating misalignment evaluation CAD data. In step ST3 of the second embodiment, misalignment evaluation CAD data, which contains misalignment amounts randomly generated on the basis of a data variance distribution in the actual manufacturing process, is produced in an amount of 100 to 200 data elements per observation pattern. Each misalignment evaluation CAD data element and SEM image data of the wiring layer are synthesized to perform misalignment evaluation.

Since the probability of tolerance of misalignment can be found from the obtained misalignment evaluation result, misalignment specifications can be determined using statistical methods.

The present invention is not limited to the above embodiments. For example, this invention is applicable to any type of LSI semiconductor device.

Other modifications can be made without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device manufacturing process evaluation method comprising:

acquiring first wiring pattern data corresponding to a shape of a wiring pattern on a layer in a semiconductor device, on the basis of a first image obtained by imaging a sample which permits imaging of said wiring pattern;

generating evaluation CAD data which synthesizes CAD data of a plurality of layers, which includes wiring CAD data of the layer with said wiring pattern;

making position coordinates of the first wiring pattern data coincide with position coordinates of a wiring pattern contained in the wiring CAD data, and producing synthesis data by synthesizing the first wiring pattern data and the evaluation CAD data; and quantizing, based on the synthesis data, a degree of overlapping between the first wiring pattern data and a pattern in the CAD data of a layer other than the layer with the wiring pattern.

2. A semiconductor device manufacturing process evaluation method according to claim 1, wherein said evaluation CAD data is generated by relatively shifting the position coordinates of the wiring CAD data and the position coordinates of CAD data other than said wiring CAD data.

3. A semiconductor device manufacturing process evaluation method according to claim 2, wherein a relative shift amount between the position coordinates of the wiring CAD data and the position coordinates of CAD data other than said wiring CAD data is determined using a misalignment amount in an actual semiconductor device manufacturing process.

4. A semiconductor device manufacturing process evaluation method according to claim 1, comprising:

acquiring second wiring pattern data corresponding to a shape of said wiring pattern and a shape of a pattern other than said wiring pattern, on the basis of a second image obtained by imaging said wiring pattern at a magnification lower than a magnification for the acquisition of the first image; and simply aligning position coordinates of the first and second wiring pattern data with position coordinates of wiring patterns contained in the wiring CAD data, wherein said producing of synthesis data includes:
calculating a correction value with which the second wiring pattern data and the pattern in the wiring CAD data become most similar; and
shifting the first wiring pattern data relative to the wiring CAD data on the basis of the calculated correction value.

5. A semiconductor device manufacturing process evaluation method according to claim 1, wherein in said producing of synthesis data, CAD data of a layer over or under the layer with said wiring pattern is used.

6. A semiconductor device manufacturing process evaluation method according to claim 1, wherein said first wiring pattern data is a line segment approximating a contour of the wiring pattern extracted from the first image.

7. A pattern shape evaluating apparatus comprising:

a database that stores CAD data of a plurality of layers, which includes first wiring pattern data corresponding to a shape of a wiring pattern on a layer in a semiconductor device and acquired on the basis of a first image obtained by imaging a sample which permits imaging of said wiring pattern, and CAD data of the layer with said imaged wiring pattern;

an evaluation CAD data generating section which generates evaluation CAD data by synthesizing the CAD data of the layer with the wiring pattern and CAD data of a layer other than the layer with the wiring pattern, which are contained in said CAD data of the plurality of layers;

a pattern matching section which produces synthesis data by making position coordinates of the first wiring pattern data coincide with position coordinates of a wiring pattern contained in the wiring CAD data in the evaluation CAD data, and synthesizing the first wiring pattern data and the evaluation CAD data; and a shape evaluation section which quantizes, based on the synthesis data, a degree of overlapping between the first wiring pattern data and the pattern in the wiring CAD data.

8. A pattern shape evaluating apparatus according to claim 7, wherein said evaluation CAD data generating section generates the evaluation CAD data by relatively shifting the position coordinates of the wiring CAD data and the position coordinates of CAD data other than said wiring CAD data.

9. A pattern shape evaluating apparatus according to claim 7, wherein said database stores second wiring pattern data corresponding to a shape of said wiring pattern, which is obtained from a second image acquired by imaging said wiring pattern at a magnification lower than a magnification for the acquisition of the first image, and said pattern matching section overlaps and relatively shifts the second wiring pattern data and the wiring CAD data, calculates a correction value with which the wiring patterns in the overlapped pattern data become most similar, and shifts the first wiring data relative to the wiring CAD data, thus producing said synthesis data.

10. A pattern shape evaluating apparatus according to claim 7, wherein said evaluation CAD data generating section generates the evaluation CAD data using CAD data of a layer over or under the layer with said wiring pattern.

11. A pattern shape evaluating apparatus according to claim 7, wherein said first wiring pattern data stored in the database is a line segment approximating a contour of the wiring pattern extracted from the first image.

* * * * *